(12) United States Patent
Donlan (10) Patent No.: US 9,282,590 B2
(45) Date of Patent: Mar. 8, 2016

(54) SELF-ADJUSTING THERMOSTAT FOR FLOOR WARMING CONTROL SYSTEMS AND OTHER APPLICATIONS

(75) Inventor: Andrew J. Donlan, Ontario (CA)

(73) Assignee: Appleton Grp LLC, Rosemont, IL (US)

( * ) Notice: Subject to any disclaimer, the term of this patent is extended or adjusted under 35 U.S.C. 154(b) by 939 days.

(21) Appl. No.: 13/445,704

(22) Filed: Apr. 12, 2012

(65) Prior Publication Data

US 2012/0261481 A1    Oct. 18, 2012

Related U.S. Application Data

(60) Provisional application No. 61/476,085, filed on Apr. 15, 2011.

(51) Int. Cl.

| F24D 19/10 | (2006.01) |
|---|---|
| F24D 13/02 | (2006.01) |
| H05B 1/02 | (2006.01) |
| G05D 23/19 | (2006.01) |

(52) U.S. Cl.
CPC ............. *H05B 1/0275* (2013.01); *F24D 19/10* (2013.01); *G05D 23/1917* (2013.01); *F24D 2220/2081* (2013.01)

(58) Field of Classification Search
CPC ...................... F24F 11/0034; F24F 2011/0036
USPC ........................ 237/12, 2 R, 81, 2 A; 700/276
See application file for complete search history.

(56) References Cited

U.S. PATENT DOCUMENTS

| RE31,044 E * | 9/1982 | McReynolds et al. ........ 701/118 |
|---|---|---|
| 5,088,645 A | 2/1992 | Bell |
| 5,395,042 A | 3/1995 | Riley et al. |
| 6,066,843 A | 5/2000 | Scheremeta |
| 6,263,260 B1 * | 7/2001 | Bodmer ............... F24F 11/0034 700/275 |
| 6,415,205 B1 * | 7/2002 | Myron ............... G06K 9/00335 700/275 |
| 7,058,477 B1 | 6/2006 | Rosen |

(Continued)

FOREIGN PATENT DOCUMENTS

| DE | 19514027 | 1/1996 |
|---|---|---|
| EP | 0631219 | 12/1994 |
| WO | 97/44720 | 11/1997 |

OTHER PUBLICATIONS

Hypercycling, Oxford English Dictionary, Oxford University Press, 2015.*

(Continued)

*Primary Examiner* — Gregory Huson
*Assistant Examiner* — Phillip E Decker
(74) *Attorney, Agent, or Firm* — McDonnell Boehnen Hulbert & Berghoff LLP.

(57) ABSTRACT

A method of controlling the temperature of an environment, including the steps of providing a thermostat and receiving a signal from an occupancy sensor indicating whether an area has been occupied for each discrete time period of a 24 hour time period, assigning a first point value to each discrete time period where occupancy has been sensed, and repeating the steps for the next two 24 hour periods, and averaging the point values for each discrete time period in the first, second, and third 24 hour periods, to obtain an average point value, and sending a first signal to a heating device adapted for heating a second area to provide a temperature-related setting for a given discrete time period when the average point value for that discrete time period is above a threshold point value.

55 Claims, 9 Drawing Sheets

(56) References Cited

U.S. PATENT DOCUMENTS

| | | | |
|---|---|---|---|
| RE40,437 E | 7/2008 | Rosen | |
| 7,552,030 B2 | 6/2009 | Guralnik et al. | |
| 8,849,462 B2* | 9/2014 | Bodnar | 700/276 |
| 8,855,793 B2* | 10/2014 | Bhargava et al. | 700/47 |
| 2005/0080601 A1* | 4/2005 | Wren | G05B 15/02 703/2 |
| 2007/0045431 A1 | 3/2007 | Chapman, Jr. et al. | |
| 2008/0083834 A1* | 4/2008 | Krebs | B60H 1/00892 237/2 A |
| 2008/0191045 A1 | 8/2008 | Harter | |
| 2009/0191521 A1* | 7/2009 | Paul et al. | 434/169 |
| 2010/0019051 A1 | 1/2010 | Rosen | |
| 2010/0025483 A1* | 2/2010 | Hoeynck et al. | 236/1 C |
| 2010/0280667 A1* | 11/2010 | Steinberg | 700/276 |
| 2011/0171724 A1* | 7/2011 | Sheldon | 435/297.1 |
| 2012/0128025 A1* | 5/2012 | Huppi et al. | 374/121 |
| 2012/0310376 A1* | 12/2012 | Krumm et al. | 700/31 |
| 2014/0277769 A1* | 9/2014 | Matsuoka et al. | 700/276 |

OTHER PUBLICATIONS

Baig, Edward C., "Nest thermostat learns your habits," Personal Technology, USA Today, 1 page. (Oct. 25, 2011).

International Searching Authority, International Search Report and Written Opinion for PCT/US2012/033614 mailed Jun. 17, 2013, 12 pages.

* cited by examiner

Lifestyle Activity Model

| Event No. | Event Start Time | Probability of Activity | Required Heat Setting |
|---|---|---|---|
| 1 | 1 | 10% | LOW |
| 2 | 50 | 90% | HI |
| 3 | 60 | 10% | LOW |
| 4 | 70 | 90% | HI |
| 5 | 80 | 10% | LOW |
| 6 | 100 | 90% | HI |
| 7 | 125 | 10% | LOW |
| 8 | 140 | 90% | HI |
| 9 | 144 | 10% | LOW |

FIG. 6

| Parameters | | | |
|---|---|---|---|
| Threshold to turn heat on for Day 1: | 75 | °F | To |
| No. of days F to pseudo average over: | 4 | | F |
| Turn heat on if avg greater than K: | 9.5 | | K |
| Max state changes H per zz periods: | 1 | | H |
| No. of periods v to average over | 3 | manual | v |
| Scale for points | 6 | manual | zz |
| No. of periods zz to limit state changes | 10 | | P |
| Bonus S | 4.5 | | S |

500 → 510, 520, 530, 540

| Day | % Actual Setting Correct |
|---|---|
| 1 | 73% |
| 2 | 87% |
| 3 | 89% |
| 4 | 92% |
| 5 | 88% |

SELF-ADJUSTING THERMOSTAT FOR FLOOR WARMING CONTROL SYSTEMS AND OTHER APPLICATIONS

RELATED APPLICATIONS

This patent application claims priority to U.S. Provisional Patent Application Ser. No. 61/476,085, entitled "Self-Adjusting Thermostat for Floor Warming Control Systems and Other Applications," filed on Apr. 15, 2011, the entire contents of which are fully incorporated herein by reference as if fully set forth herein.

FIELD

This patent application is directed to thermostats used to control temperature in an environment. In particular, this patent application is directed to a self-adjusting thermostat for floor warming control systems and other applications.

BACKGROUND

Thermostats are widely regarded as being useful for controlling the temperature of rooms, ovens, pipes, floors, etc. These devices have been provided for many decades with increasingly useful features, such as larger range of application temperatures, improved accuracy, improved styling, etc.

Easy Heat Limited (EH) manufacture electric heating cables for a variety of applications including snow melting, pipe freeze protection, floor heating, etc. More detail can be viewed at www.easyheat.com. EH also provide a variety of controls for each application, such as thermostats, snow sensors, ground fault sensors, etc.

One of EH's main product lines is floor heating cables that are used to warm floors of homes, especially bathroom floors, but also kitchens, foyers, etc. This product is most popular for use with ceramic/marble type floors due to the inherently "cold" nature of such floors. EH also provide a line of thermostats to enable the user to adjust the floor temperature to their personal comfort level. These thermostats have an external sensor that is embedded in the floor to sense the floor temperature, and is wired back to the thermostat control unit. The thermostat has an adjustable temperature setting that is set by the user. This then facilitates the control of the temperature of the floor by turning the heating cables off when the floor has reached the temperature setting (setpoint) and then turning them on again when the floor temperature has fallen below the setpoint.

Further, some of the thermostats provided by EH have electronic capabilities, such as digital display, clock, etc. so that additional features can be provided. One of the most desirable features is the "setback" program. This feature allows the user to select the time periods ("events") when they can tolerate a lower floor temperature, such as, say, when they are sleeping, and to select time periods when they prefer a warmer floor temperature, such as, say, when they get up in the morning and use the bathroom. Clearly, this feature provides the user with convenience and allows the user to save considerable energy by warming the floor only when it is expected to be used. These thermostats are typically provided with a "default" program in them to adjust the floor during four separate events, such as follows:

6 am to 8 am: Floor temperature set to 85° F. ("Wake" event)

8 am to 5 pm: Floor temperature set to 60° F. ("Leave" event)

5 pm to 9 pm: Floor temperature set to 85° F. ("Return" event)

9 pm to 8 am: Floor temperature set to 60° F. ("Sleep" event)

The time and temperature settings are all adjustable, thus allowing the users to "program" their thermostat to suit their lifestyle. Further, the utility of the setback thermostats can be enhanced by offering a "5/2" option or a "7 Day" option. In the 5/2 option, the days of the week (Monday to Friday) are considered to be identical and the weekends (Saturday and Sunday) are also considered to be identical, but not necessarily identical to the weekdays. In the 7 Day mode, each day can be "unique" in that different time/temperature settings can be made for each day. The 7 Day option is important to users who do not have a regular "weekday/weekend" type lifestyle but do have a regular "weekly" lifestyle—i.e. their Mondays are always the same, Tuesdays may be different than Mondays, but all Tuesdays would be the same, etc.

One additional issue of note is that ceramic/marble type floors have a large "thermal mass," meaning that they heat up slowly and they cool down slowly. As a result, it is necessary to energize the heating cables well in advance of usage, typically at least one hour and this "anticipation" feature is typically built into the setback thermostats. This further eliminates any value in attempting to deenergize the system for a short duration such as, say, 10 minutes, as the floor will cool only slightly in this time and then will take that much longer to get back up to temperature after restarting.

While the standard setback thermostat as described above has provided utility for many years, there are certain problems that it still has not overcome. Mainly, these units are typically esoteric to program and often require the user to refer to a lengthy, complicated owner's manual. Further, with only four events per day, this often does not recognize the diverse lifestyle of modern users. For example, it would not be uncommon on any given day for the bathroom to be used as follows:

Occupied from 5:30 to 6 am
    Unoccupied 6 am to 8 am
    Occupied 8 am to 9 am
    Unoccupied 9 am to 3 pm
    Occupied 3 pm to 3:30 pm
    Unoccupied 3:30 pm to 6 pm
    Occupied 6 pm to 7 pm
    Unoccupied 7 pm to 10 pm
    Occupied 10 pm to 11 pm
    Unoccupied 11 pm to 5:30 am Clearly, the typical, four-event, setback thermostat will not be able to exactly match this usage. Probably, it would have to be programmed to turn on at 5:30 am and stay on till 9 am, then off till 3 pm then on till 11 pm, then off until 5:30 am. This would increase energy usage from, ideally, 4.5 hours to 11.5 hours—almost tripling energy usage! Of course, this problem could be addressed by increasing the number of events from four to, say, 8—but this will further complicate the "programming" procedure.

The standard setback thermostat also does not easily accommodate changes to usage patterns—whether this is a result of lifestyle changes, such as a new job with different working hours, or even going on vacation—these changes require manual intervention, usually reprogramming of the thermostat with the corresponding frustration that most users experience in attempting to accomplish this change. Again, users typically simply ignore these changes, which results in discomfort and/or energy waste.

Setback thermostats are, generally, highly regarded in the industry as they theoretically allow customers to save energy costs. Governments promote them and often provide incentives for users to purchase them. However, the problem is that, in actual experience, very few of these units are ever used in the "programmable" mode—most users simply put them in "manual" mode and leave them in such a mode, thereby having the thermostat control the floor temperature at the same level at all times, rather than de-energizing the cables during periods when the room is not occupied. The reason for this, it is believed, is that the thermostats are too time-consuming and/or complicated for the average user to "program."

SUMMARY

It is expected that a setback type thermostat that studied the occupancy patterns of the room in which it was located and then adjusted its time/temperature settings accordingly (i.e. "self-adjusting") would be a significant benefit to consumers and result in significant energy savings. The present embodiments are directed to a self-adjusting thermostat for floor warming applications that is unique. This is achieved by sensing the activity of the occupants of the room and memorizing this activity and then processing this data in an algorithm to estimate the room occupancy "patterns." The floor heating is then adjusted to match the expected usage patterns of the occupants.

The occupancy sensing is accomplished by an electronic device that detects the presence of humans in the room. The basic technology for sensing the presence of occupants is ubiquitous. For example, in-light fixtures/switches that sense persons in the immediate vicinity, or room fragrance dispensers etc. may be used to sense occupancy. There are a variety of technologies available for these various sensors, such as infra-red sensing, line of sight, heat, pressure, magnetic, capacitive/inductive coupling, etc.

The algorithm that may be used to "process" the occupancy information and determine the appropriate adjustments to a "schedule" for floor heating is embedded in a microprocessor in the thermostat. The algorithm has been developed to optimize the "learning" of the thermostat.

An embodiment includes a method of controlling the temperature of an environment, such as a flooring surface, comprising the steps of providing a thermostat adapted to have values in the memory of a microprocessor assigned for each discrete time period for a 24 hour time period, receiving a signal from an occupancy sensor in a first area indicating whether that area has been occupied for each discrete time period of a 24 hour time period, assigning a first point value to each discrete time period where occupancy has been sensed during that discrete time period in a first 24 hour time period, assigning a second point value to each discrete time period where occupancy has been sensed during that discrete time period in a second 24 hour time period that predates the first 24 hour time period, assigning a third point value to each discrete time period where occupancy has been sensed during that discrete time period in a third 24 hour time period that predates the second time period, averaging the point values for each discrete time period in the first, second, and third 24 hour periods, where occupancy was sensed in any of the first, second, or third 24 hour periods to obtain an average point value, sending a first signal to a heating device adapted for heating a second area to provide a temperature-related setting for a given discrete time period when the average point value for that discrete time period is above a threshold point value.

A further embodiment is directed to a system for controlling the temperature of an environment, such as a flooring surface, comprising an input/output unit associated with a computer processing unit and a memory adapted to have values assigned for each discrete time period for a 24 hour time period, an occupancy sensor in a first area that sends a signal to the input/output unit indicating whether that area has been occupied for each discrete time period of a 24 hour time period, a first point value assigned to each discrete time period where occupancy has been sensed during that discrete time period in a first 24 hour time period, a second point value assigned to each discrete time period where occupancy has been sensed during that discrete time period in a second 24 hour time period that predates the first 24 hour time period, a third point value assigned to each discrete time period where occupancy has been sensed during that discrete time period in a third 24 hour time period that predates the second time period, an average of the point values for each discrete time period in the first, second, and third 24 hour periods, where occupancy was sensed in any of the first, second, or third 24 hour periods to obtain an average point value, a heating device that receives a signal from the input/output device adapted for heating a second area to provide a temperature-related setting for a given discrete time period when the average point value for that discrete time period is above a threshold point value K.

A further embodiment is directed to a self-adjusting thermostat for controlling the temperature of an environment, such as a flooring surface, comprising an input/output unit associated with a computer processing unit and a memory adapted to have values assigned for each discrete time period for a 24 hour time period, wherein the input/output unit is adapted to receive a signal from an occupancy sensor in a first area indicating whether that area has been occupied for each discrete time period of a 24 hour time period, a first point value assigned to each discrete time period where occupancy has been sensed during that discrete time period in a first 24 hour time period, a second point value assigned to each discrete time period where occupancy has been sensed during that discrete time period in a second 24 hour time period that predates the first 24 hour time period, a third point value assigned to each discrete time period where occupancy has been sensed during that discrete time period in a third 24 hour time period that predates the second time period, an average of the point values for each discrete time period in the first, second, and third 24 hour periods, where occupancy was sensed in any of the first, second, or third 24 hour periods to obtain an average point value, wherein the input/output unit is adapted to send a signal to a heating element for heating a second area to provide a temperature-related setting for a given discrete time period when the average point value for that discrete time period is above a threshold point value K.

BRIEF DESCRIPTION OF THE DRAWINGS

Exemplary embodiments are described herein with reference to the drawings wherein.

DETAILED DESCRIPTION

Figure 1:
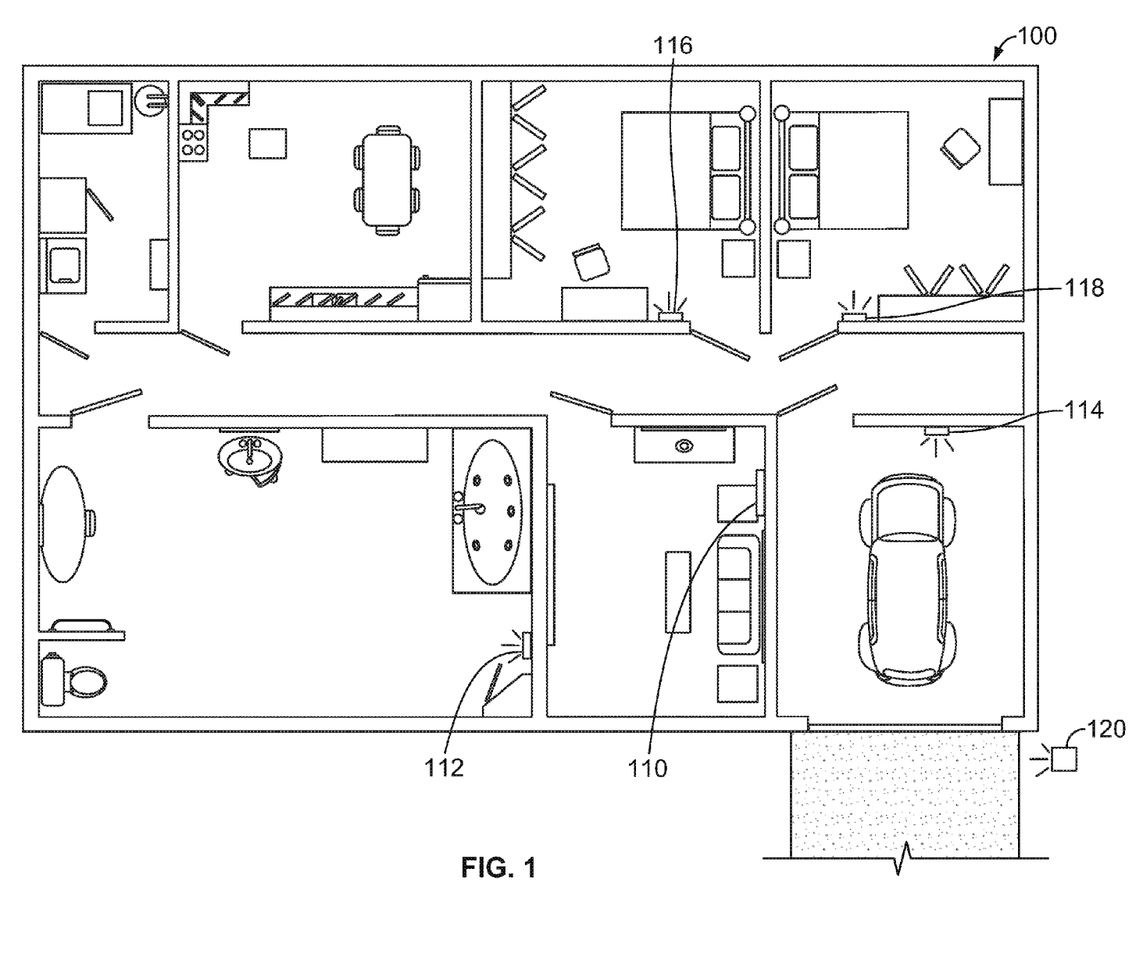
FIG. 1 is an overhead view of an environment 100 that includes a self-adjusting thermostat 110 and one or more occupancy sensors.

FIG. 1 is an overhead view of an environment 100 in which a self-adjusting thermostat may be used. Environment 100 is shown as a residential building, but may also be any commercial or industrial building where it desired to control the temperature of the floor or area of the environment, and is thus not limited to a residential building. A self-adjusting thermostat 110 is shown positioned within the environment 100. The self-adjusting thermostat 110 is in communication with occupancy sensors 112, 114, 116, 118, and 120. Although a plurality of occupancy sensors are shown, the self-adjusting thermostat may be used with only a single occupancy sensor as desired. The occupancy sensors may take a variety of forms as noted above and may include, infrared, line of sight, heat, magnetic, capacitive/inductive coupling sensors, as well as in-light fixtures/switches that sense persons in the immediate vicinity or the mechanism used in room fragrance dispensers etc. may be used to sense occupancy. Thus, any sensor that is capable of sensing the presence of an occupant within an area may be used. The occupancy sensors are used to detect the presence of occupants within the area they are located.

Figure 2:
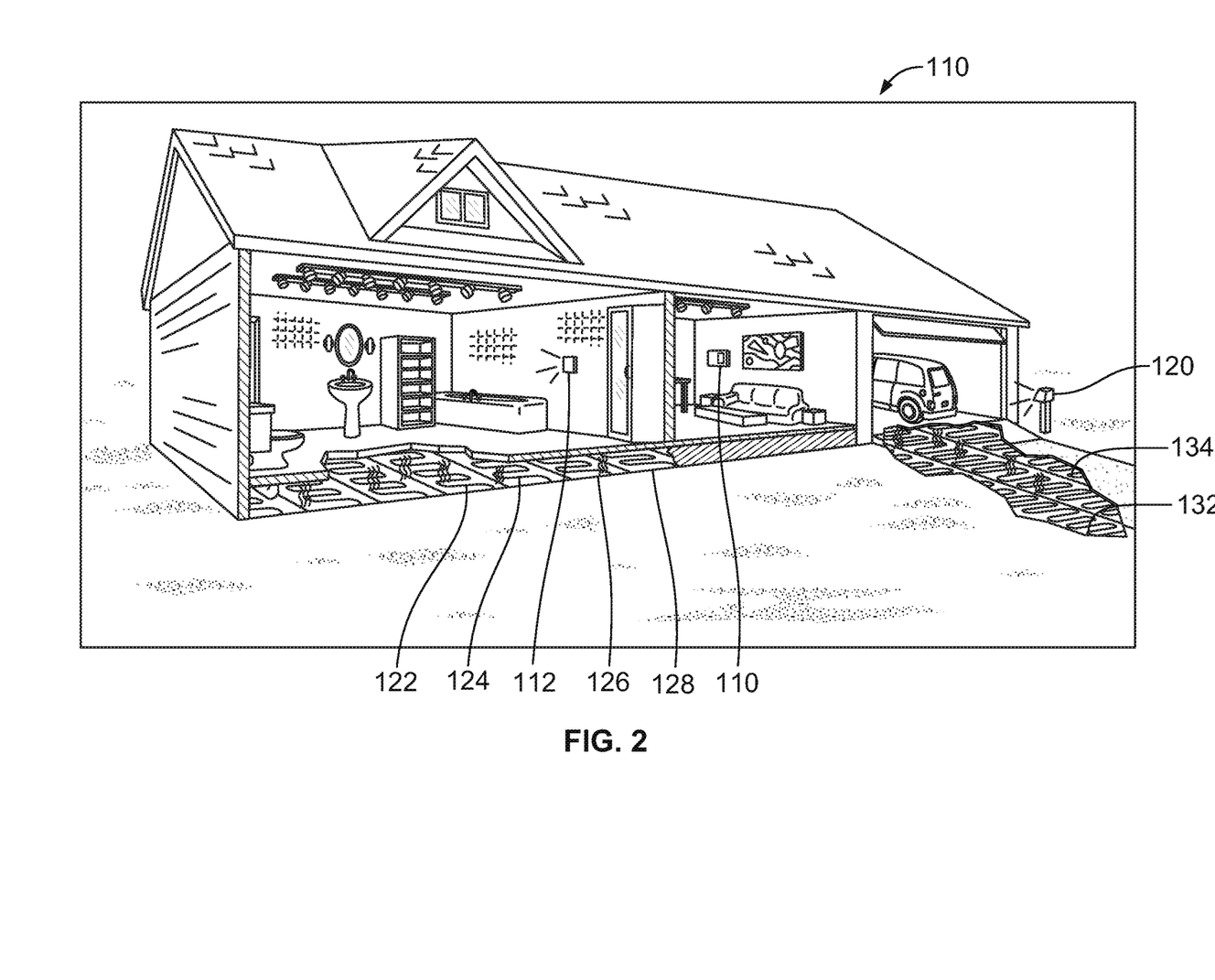
FIG. 2 is a perspective view of the environment of FIG. 1.

FIG. 2 is a perspective view of environment 110 shown in FIG. 1. The self-adjusting thermostat 110 is shown positioned in the living room of environment 110, although it could also be positioned anywhere within environment 110, or even operate remotely from environment 110. Occupancy sensor 112 is shown positioned in the bathroom of environment 110 and may sense the presence of an occupant within the bathroom. The information regarding whether or not an occupant is present may be sent back to self-adjusting thermostat 110 which may be hard wired to the occupancy sensors or operate wirelessly using known communication protocols such as Wifi, Bluetooth, Zigbee, Wimax, IEC 802.11 standards, or other known communication protocols, as examples.

In addition, heating elements 122, 124, 126, and 128 are shown positioned beneath the floor of the bathroom, and upon a signal from the self-adjusting thermostat 110 may operate to heat the floor of the bathroom. Similarly, heating elements 132 and 134 are shown positioned beneath the driveway of the environment 100 and operate for example to heat the driveway to melt snow or ice that may have accumulated. The self-adjusting thermostat 110 may also communicate with the heating elements through hard wiring or operate wirelessly using known communication protocols such as Wifi, Bluetooth, Zigbee, Wimax, IEC 802.11 standards, or other known communication protocols, as examples. It will be appreciated by those of skill in the art, that although heating elements for heating a floor are shown in FIG. 2, the heating element may also be in the form of a furnace to heat or control the temperature of the air within an environment.

Figure 3:
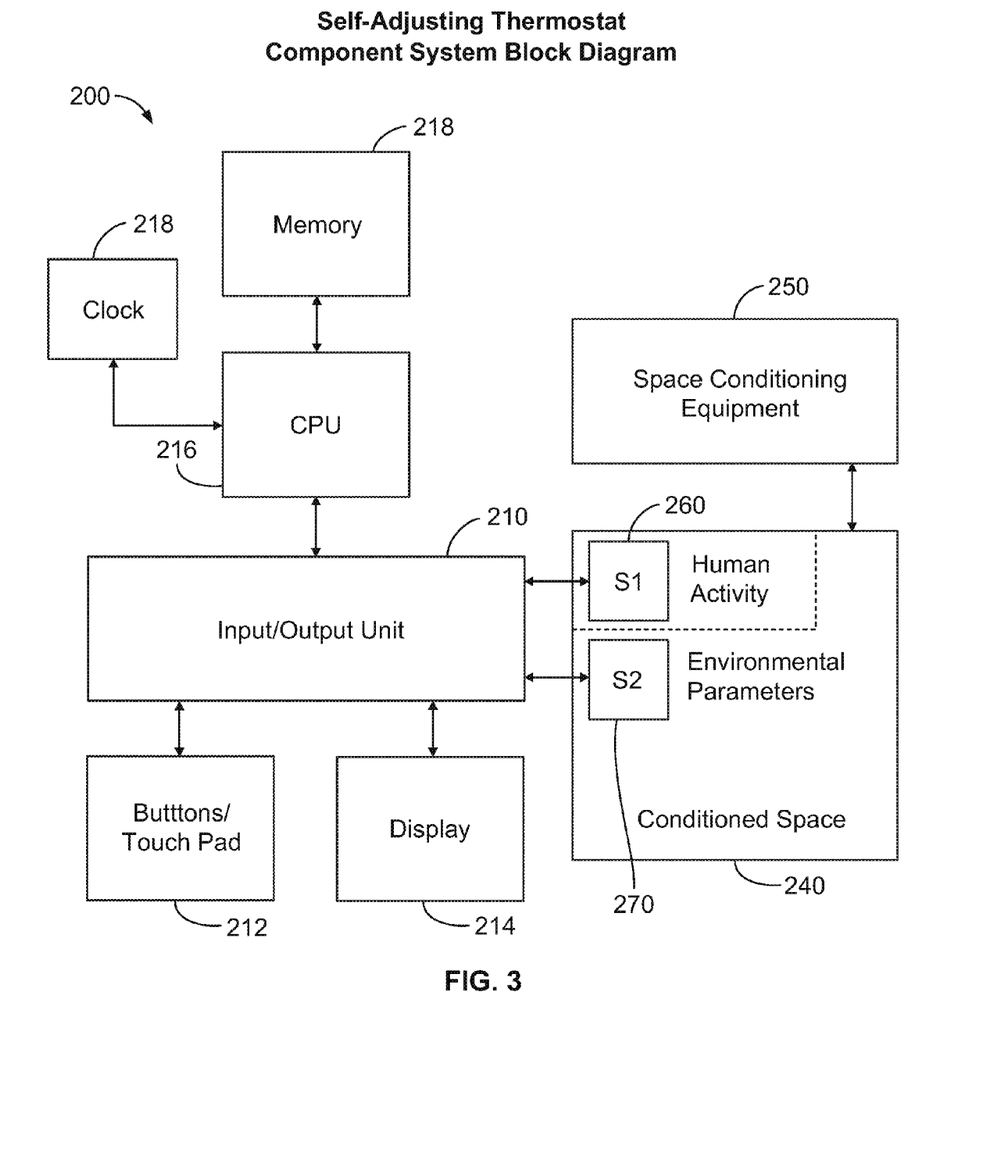
FIG. 3 is a block diagram of the components and system of the disclosed self-adjusting thermostat that may be used in the environment shown in 1 and 2.

FIG. 3 illustrates a block diagram 200 of the components and system used to control the heating elements that are used in connection with the self-adjusting thermostat. The self-adjusting thermostat includes an input/output unit 210 that receives signals from the occupancy sensor(s) 260 (S1) positioned within the conditioned space 240. Environmental parameters 270 (S2), including temperature and humidity as examples, may also be input in to the input/output unit 210. Input/output unit 210 may include buttons or a touch pad 212 that allow for user input of preferences and parameters, as well as a display 214 that may display information, such as temperature or settings to a user. The input/output unit is coupled to a CPU 216 and memory 220 which may store the parameters, settings, and information from the occupancy sensors, as well as a clock 218. Space conditioning equipment 250 is also in communication with the input/output unit 210 and may receive signals indicative of a level of heat to provide. The space conditioning equipment may include heating cables positioned under the floor, or cooling elements to cool the floor, or may take the form of HVAC equipment.

Basic Operation

In an embodiment, an algorithm is included in the self-adjusting thermostat that is configured to incorporate data from the daily activity that is sensed in the vicinity of the occupancy sensors and/or thermostat. Each day is divided into 144 periods, each of 10 minutes duration, with the first period being 12:00:00 am to 12:09:59 am, the last ($144^{th}$) period being 11:50:00 pm to 11:59:59 pm. The occupancy sensor signal would then be used to indicate whether or not there was "activity" in any period, i.e., presence of an occupant. If no activity was sensed in any period, then that period would be identified as "inactive" and this data recorded for future reference. If occupancy was sensed in any period, that period would then be identified as "active" and this data would similarly be retained in memory. Multiple occupancy sensings within any one period would not change the status of the period in question, i.e., whether 1 or 5 or 10 or more sensings were detected within the period would not change the status ("active") of that period. Hence, by observing the occupancy data for each day, the usage patterns for the room can be estimated. Assuming each day had a similar occupancy pattern, then after a few days, it could be expected that the normal pattern for that day could be estimated with reasonable precision.

Once the usage pattern has been estimated, the control of the floor or area temperature can be correspondingly adjusted. It is expected that during occupancy periods, the user would want the floor or area to be at a warm temperature ("High") and during non-occupancy periods at a much lower temperature ("Low").

Figure 4:
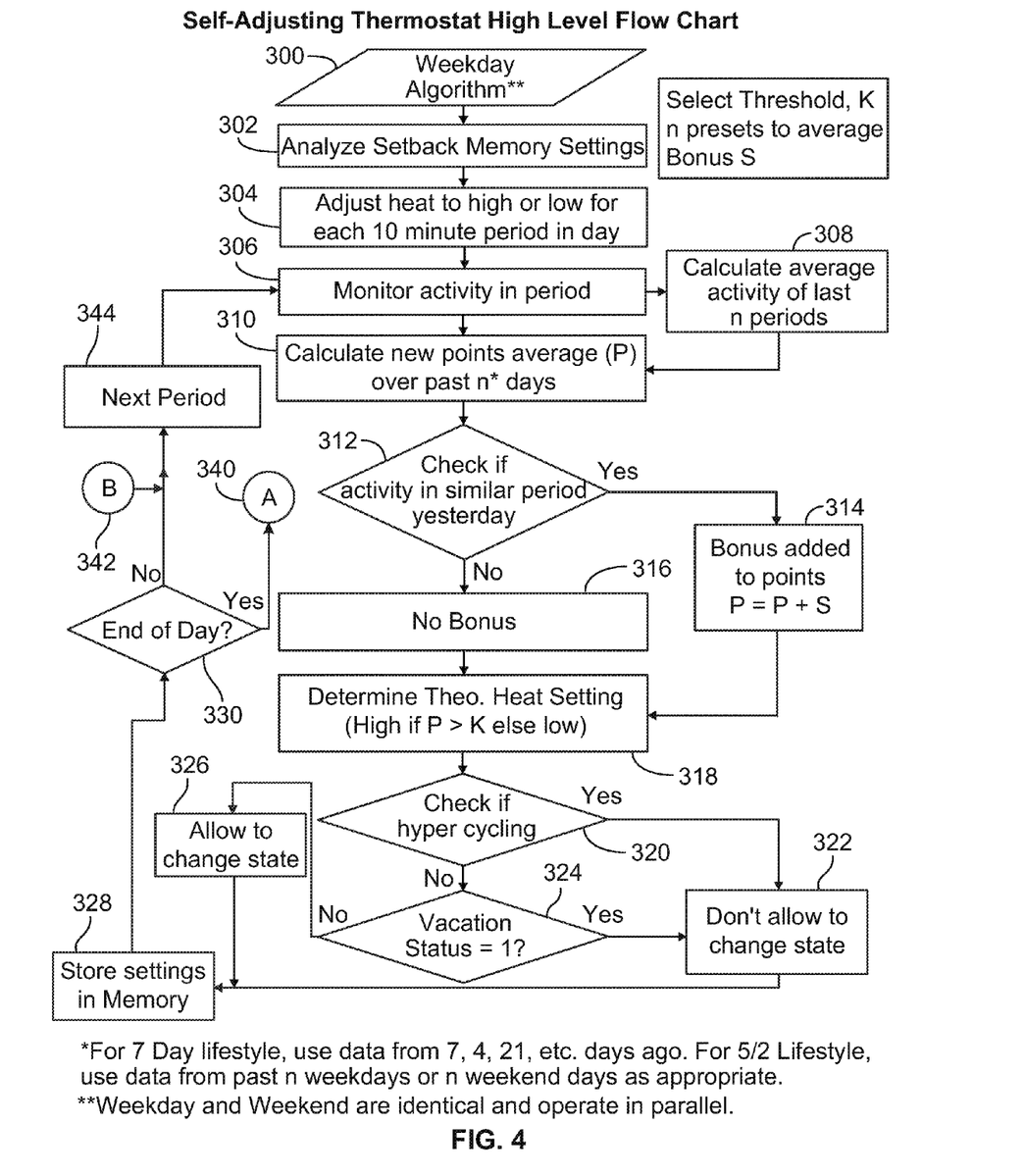
FIG. 4 is a flow chart setting forth the steps performed by the self-adjusting thermostat.
Figure 5:
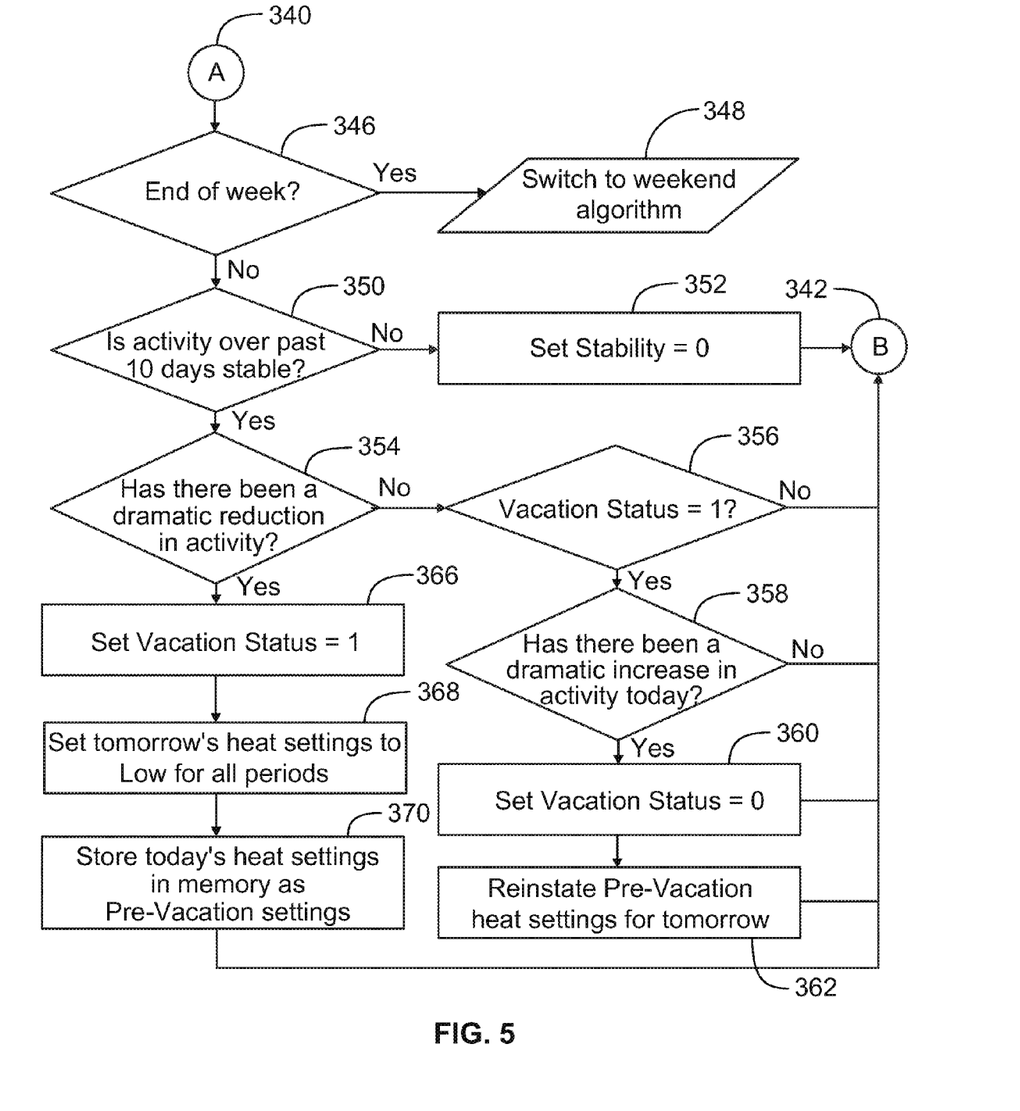
FIG. 5 is a continuation of the flow chart shown in FIG. 4.

FIGS. 4 and 5 disclose a flow chart of the algorithm used in connection with the self-adjusting thermostat. The flow chart begins with weekday algorithm 300, which may be identical to and may run in parallel with the weekend algorithm. At step 302, the setback memory settings are analyzed, and at step 304 the heat may be adjusted to High or Low for each of the 144 ten minute periods during the day. The activity (i.e., occupancy) is monitored during each ten minute period during the day. At step 308, the average activity for the last n periods prior to the current period is calculated. At step 310, a new points average is calculated over the last n days. For the 7-day Lifestyle setting, use date from 7, 14, 21, etc. days ago is used, whereas for the 5/2 Lifestyle setting, use data from the past n weekdays or n weekend days are used as appropriate.

Step 312 checks whether the activity in the time period is similar to the activity from the prior day. If so, Bonus points S are added to the point total. If the answer in step 312 is "no" then no bonus points are added. The next step is step 318, the heat setting is determined, e.g., High if the point total P is greater than a threshold point value K, and low if the point total P is equal to or lower than a threshold point value K. Step 320 next checks to see if there is hypercycling. If the answer to step 320 is "yes" then a change of state is disallowed. If the answer to step 320 is "no" then at step 324, the system checks to see if vacation status is equal to one; and if "yes" then a change of state is disallowed, but if the answer if "yes" that at step 326 the state is allowed to change. Next, at step 328 the settings are stored in memory. At the next step 330 a determination is made as to whether it is the end of the day, e.g., the 144$^{th}$ time period. If the answer is yes, then the process continues to step 340 "A," and if the answer is "no" then, at step 344 the process continues to analyze the next time period and continues and returns to step 306.

As shown in FIG. 5, after step 340 "A," at step 346 it is determined whether it is the end of the week. If the answer is "yes," then the process proceeds to step 348 where the program switches to the weekend algorithm. If the step 346 is "no," then at next step 350 a determination is made to determine if the activity of the past ten days has been stable (see discussion on Stability below). If the answer to step 350 is "no," then at step 352 the Stability is set to zero and the program moves to step 342 (B). If the answer to step 352 is "yes," then a determination is made if there has been a dramatic reduction in activity. If the answer is "yes," then at step 356 the program checks to see if the vacation status equals "1" and if not, it proceeds step 342 (B). If the answer to step 356 is "yes," then a determination is made regarding whether there has been a dramatic increase in activity in that day. If no, then the program proceeds to step 342 (B), and if yes, then the vacation status is set to zero at step 360. At next step 360, the pre-vacation heat settings are reinstated for the following day. If the answer to step 354 is "yes," than at step 366, the vacation status is set to 1. At next step 368, the heat settings for the following day are set to low for all periods (as it is determined the occupants are on vacation). At next step 370, the current day's heat settings are stored in memory as pre-vacation settings.

The algorithm analyzes the occupancy data from previous similar time periods and then determines if the heat should be adjusted to High or Low, although intermediate settings could also be used if desired. This decision is facilitated by allowing each period to accumulate "points" which would be increased when activity associated with a time period is detected, and decreased when no such activity is detected. When a pre-set threshold of points is reached, the heat is set to High for that period, and when it falls below the threshold, the heat is set to Low.

The initial points value for each period may be based on the time and temperature requirements in the setback program, either as provided in the factory settings or, if these have been modified by the user, the setback program such as it would exist. By simple analysis of the setback program time/temperature settings, the requirement to have the floor or area heat adjusted to High or Low for each period can be determined. Then, each period that is required to have the heat adjusted to High may be assigned 10 points and each period with heat adjusted to Low may be assigned 0 points. As time goes by, the points in each period may be modified based on the activity pattern of the occupants. In some embodiments it may be desirable to vary the maximum point value that is assigned to provide higher point values for the most recent time periods. For example, the current period may assign 10 points when activity is senses, and the same period 24 hours earlier may be assigned a maximum of 7 points, while the same period 48 hours earlier may be assigned a maximum of 5 points. Using such a scaled approach would accord more importance to the most recent activity.

Expedited Learning

Since most modern lifestyles are not identical for each of the seven days in a week, it may take several weeks for the occupancy pattern for each day to be learned. For example, since Saturday activity is usually different from, say, Tuesday activity, it could be expected that a typical "learning algorithm" would take several weeks, possibly even a month or longer, to learn the pattern for Tuesdays. In order to expedite the learning process then, it becomes beneficial to identify if the occupants at least have a regular Monday to Friday pattern and a similar regular Saturday/Sunday pattern—i.e. "5/2 Day" lifestyle—or "7 Day" lifestyle. By utilizing the lifestyle information, the algorithm can expedite the learning process. The reason for this is that, in the 7 Day lifestyle pattern, it is expected that "Monday" occupancy patterns are likely different from "Tuesday" which are different from "Wednesday" etc. Hence, the algorithm is going to take several weeks to gain sufficient experience with the Monday occupancy pattern to make appropriate adjustments—same for Tuesdays, etc. As a result, it will take the algorithm several weeks to complete its learning process. However, with the 5/2 Day lifestyle pattern, since Monday-Friday are expected to be similar, the algorithm will only need a few days to learn the occupancy pattern for the weekdays, and likely only a couple of weeks to learn the weekends. So, by identifying the lifestyle as 5/2 Day type, the algorithm starts by using the corresponding settings and quickly learns the occupancy patterns and makes appropriate adjustments to the time and temperature settings.

Noise Reduction

It is expected that occupants will be entering the room from time to time at all hours of the day/night, even though there will most likely be some periods where activity will be higher and other periods where it will be lower. It is considered important to ensure that non-regular activity in a period is recognized and ignored; in other words, it is important to establish a pattern of activity before making any adjustments to the time and temperature settings. During normally unoccupied periods, it is still possible that the occupant could enter the room such as, for example, if someone comes home from work early one day; this is considered "noise" since it is not part of the "regular" activity pattern. Hence, it is important to recognize noise and temper it by considering the "average" activity associated with that time period. This recognition is incorporated into the algorithm by averaging the activity of several recent periods and using that to influence the points associated with the current period. Further, by utilizing the average points of several similar time periods of previous days, this further tends to reduce the effects of noise.

Sensitivity Adjustment

The adjustment algorithm may provide "bonus points" for activity that repeats itself at about the same time each day. This then provides the basis for the algorithm to incorporate the "sensitivity" of the user—if the user is very sensitive and always wants to have the floor heated when they are using it, then that can be incorporated. If the user is less sensitive, i.e. willing to accept a non-heated floor for short periods, then that also should be accommodated. This helps to recognize activity that may be of very short duration but very regular—such as, say, entering the bathroom each day sometime between 12:00 and 12:30 pm but then exiting within 5 or 10 minutes. By making the bonus points larger or smaller, and allowing the user to adjust such, the "sensitivity" of the algorithm to regular, short duration activities can be amplified or attenuated. Hence, a small (or possibly zero) bonus would result in these activities being ignored by the algorithm; conversely, a large bonus would more likely result in these activities being recognized and the floor heat energized in anticipation of occupancy.

Hypercycling Elimination

As the system is operated, the floor temperature will be adjusted in accordance with the operation of the algorithm as described above. However, EH experience is that users are aware of the operation of the floor heat, as they can often hear the activation of the relay in the control unit of the thermostat, or they observe the status on the thermostat display which typically indicates floor temperature. Frequent adjustments of the floor temperature is a common concern of users and also places stress on components, such as relays, in the thermostat, so it is desirable to minimize start/stops. The algorithm is designed to limit temperature adjustments to a factory pre-set amount, such as once per hour maximum, thereby limiting stress on components and reducing customer concerns.

Absence Recognition

The algorithm as noted above is capable of recognizing when users change their occupancy patterns, whether such changes are minimal, such as a slightly modified work schedule, or more significant, such as an extended vacation. In the event of unusual absence of the occupants, such as would occur as a result of vacation, the algorithm is capable of recognizing this and reacting immediately by forcing all the settings to Low.

Pre-Absence Memory (PAM)

After an absence, such as when occupants return from vacation, the algorithm will recognize that activity has resumed and will then immediately re-instate the heat settings that were in effect prior to absence. This eliminates the need for the thermostat to re-learn the occupancy patterns thereby providing greater comfort and energy savings.

The PAM is set up by first determining the "Stability Factor" (SF) of the system. The SF for Day 'n' is set equal to the number of periods from Day 'n' that have the same heat setting as the number of periods in Day 'n−1'; clearly, SF will range from 0 to 1. For Day 'n+1', SF is set equal to the number of periods in Day 'n+1' that have the same heat setting as the number of periods in Day 'n'. When n=10, the average and standard deviation of SF (defined as ASF and SDSP respectively) will be calculated. The activity similarity index ASI is also calculated as the proportion of periods from Day n and Day n−1 that have similar activity. The average activity level AL is set equal to the number of periods of activity divided by the total number of periods (for example, 3 periods of activity out of 144 total periods would be 2% activity). Hence, Stability is defined as average SF greater than 80% AND standard deviation of SF less than 5% AND ASI greater than 80%. When Stability is detected, the settings for each period from that Day will be stored in memory and will thereby over-write any previous settings.

As each day passes, SF, ASI and AL are updated using data from the past 10 days. If stability is not determined for any day, the heat settings for that day will not be stored in memory, leaving the previous settings in memory unchanged.

When stability returns, the new heat settings are compared to the existing heat settings in memory—if they are distinctly different, the existing heat settings are not "overwritten" for 20 days. Once stability has been detected, if the AL level drops to 5% of the previous day, occupants are assumed to be gone and so all settings are set to LOW. If AL increases to greater than 10% AND greater than 600% of the previous day, then occupants are assumed to have returned so use of pre-absence settings immediately.

Applications

It should be noted that the present disclosed thermostat is particularly well-suited for floor warming applications. It could be used for indoor or outdoor flooring surfaces. For example, it could be used for warming bathroom floors, or controlling the temperature of indoor or outdoor parking garages, or driveways. Occupancy sensing in such cases could include sensing the presence of people or sensing the presence of a vehicle. In addition, this thermostat could also be used in many other applications including controlling the air temperature in residential and commercial premises, or in other applications controlling the temperature of water or other liquids.

Furthermore, in some instances occupancy sensed in a given area will give rise to heating in a different area. For example, in a hospital if occupancy is sensed in the scrubbing room, then the operating room will have the floor or air heated. As another example, if occupancy is sensed in the garage of a home, then the floor heat in the kitchen may be activated since, presumably, the occupants have just arrived home and are about to start using the kitchen area.

Parameter Optimization

There are various parameters referenced above that are required to be established—these include the following:

(a) Threshold Temperature "$T_o$": This is the temperature that will be used to determine "HIGH" heat setting or "LOW" heat setting. Typically, this will be set to 75° F. for floor heating applications since this is well above factory "LOW" settings on these types of thermostat (typically 60° F.) and below "HIGH" factory.

(b) Threshold Points "K": This the level of points above which the heat for a particular period is energized and below which it is de-energized.

(c) Bonus "S": This is the additional points awarded to any particular period that has experienced activity in a previously similar period.

(d) Days to average activity over "F": This value is used to ensure that several days are taken into consideration before making a decision about any particular day—this will reduce the "transient" effect of "unusual" activity, such as when someone would be home on a day when they are ordinarily not at home. Such "noise" can then be dampened and not result in the system making "hasty" decisions. Given that many weeks of the year have at least one holiday, it is expected that the maximum reasonable number for this would be 4. Similarly, clearly 2 is the minimum since "one" does not allow any noise dampening. As a result, the value of 3 was chosen for this parameter.

(e) Periods to average activity over "v": This value is used to allow for minor variations in schedule or short absences. In morning activity, it is common for schedules to vary by at about 10 minutes (especially given that the "snooze" button on a clock radio is 9 minutes). Hence this value is set as 3 periods.

(f) No. of cycles "H" to allow in a fixed number of periods "zz": Based on direct experience with thermostat users, this number is set to 1 per hour (zz=6 periods). Values greater than about 1 per hour tend to be noticed and considered annoying by users.

As a result of the above, it is clear that the values for the Threshold Points K and the Bonus S are not readily evaluated and so need to be empirically determined. To assist in this process, the arbitrary range of 0 to 10 is established for K. By inference, this range is also applicable to S because the bonus, which is meant to "reward" similar activity in a previously similar period, would not be expected to "overwhelm" the process by artificially inflating the value of any particular period.

The use of standard system simulation techniques for modeling technical processes is used to determine the optimum values of K and S within the context of the algorithm. This allows both K and S to be separately varied and their effect on the system determined.

Determination of Threshold and Bonus Parameters

A spreadsheet was used to model the system as noted above. Each day was divided into 144 discrete periods, and each period utilized the logic of the algorithm to determine if the heat setting should be HIGH or LOW. A total of 5 days were built into the spreadsheet model, from Day 1 to Day 5. Only 5 days were modeled because it was expected that a proper algorithm would learn the habits of the occupants within 5 days. Otherwise, the algorithm risks instability due to lifestyle variations and/or is too slow to react to changes in lifestyle—even short term changes.

The performance of the algorithm, of course, is solely based on the values of K and S since they are the only parameters considered being of significant variation. The performance of the algorithm is quantified by comparing the number of periods in which the actual heat setting, as determined by the model on any given day, agrees with the required heat setting. For example, if the actual setting agreed with the required setting for 141 of the 144 periods on a particular day, then the model would be considered to be 98% accurate on that day.

Figure 6:
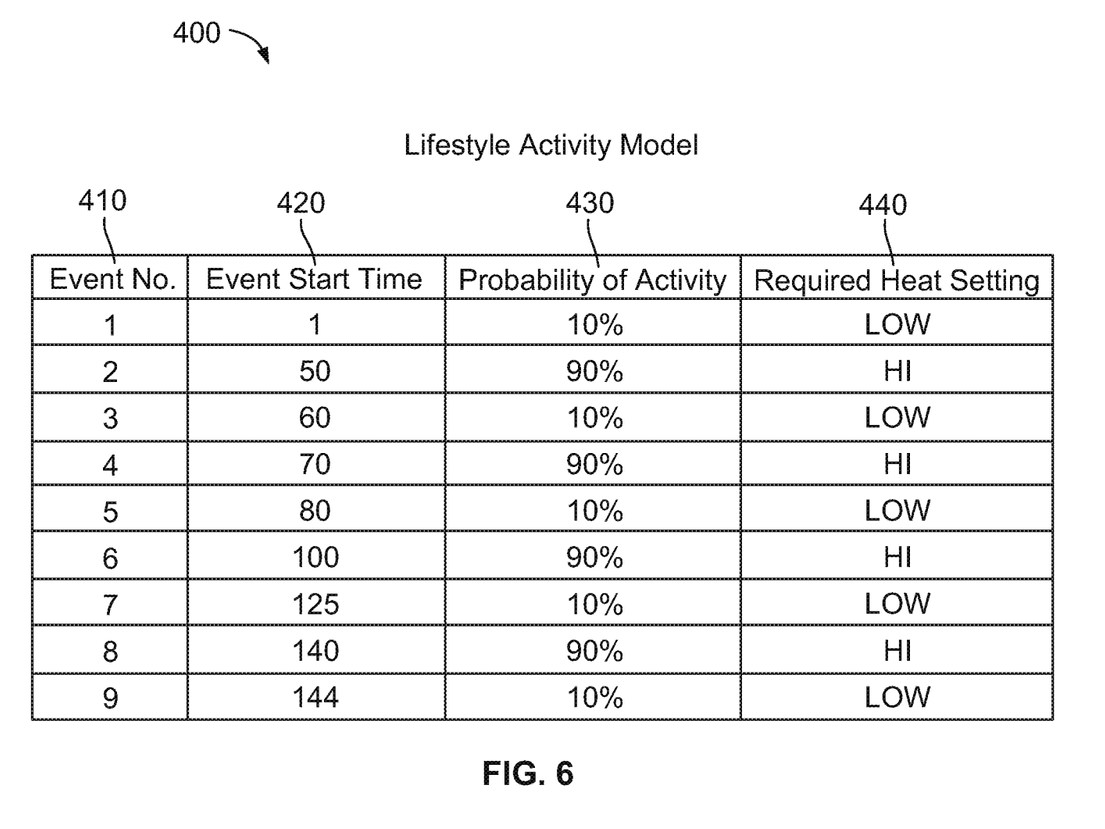
FIG. 6 is a chart of a lifestyle activity model used to simulate and test the operation of the self-adjusting thermostat.

As illustrated in Lifetime Activity Model Table 400 shown in FIG. 6, the lifestyle of the occupants was simulated based on a fictitious lifestyle having 9 different "events" 410 each having different event start times 420 and the probability of activity 430 in each event being either 90% or 10% and each of the 9 events having a required heat setting 440 set at Hi or Low. Thus, even during "unoccupied" periods, there is always some probability that activity would be detected—such as if someone was up in the middle of the night or someone came home from work during the day. These values are then used to simulate activity in any given period by the use of the "random number generator RAND" feature in the spreadsheet. RAND provides a different number between 0 and 1 for every cell in which it is embedded. Then, by analyzing the random number in each cell, the activity in the cell is determined based on the probability of the event. For example, if probability of activity in the event was 90%, then activity would be considered to have occurred if the random number was less than 0.90. Of course, this type of comparison and decision is trivial using modern spreadsheet capabilities.

Figure 7:
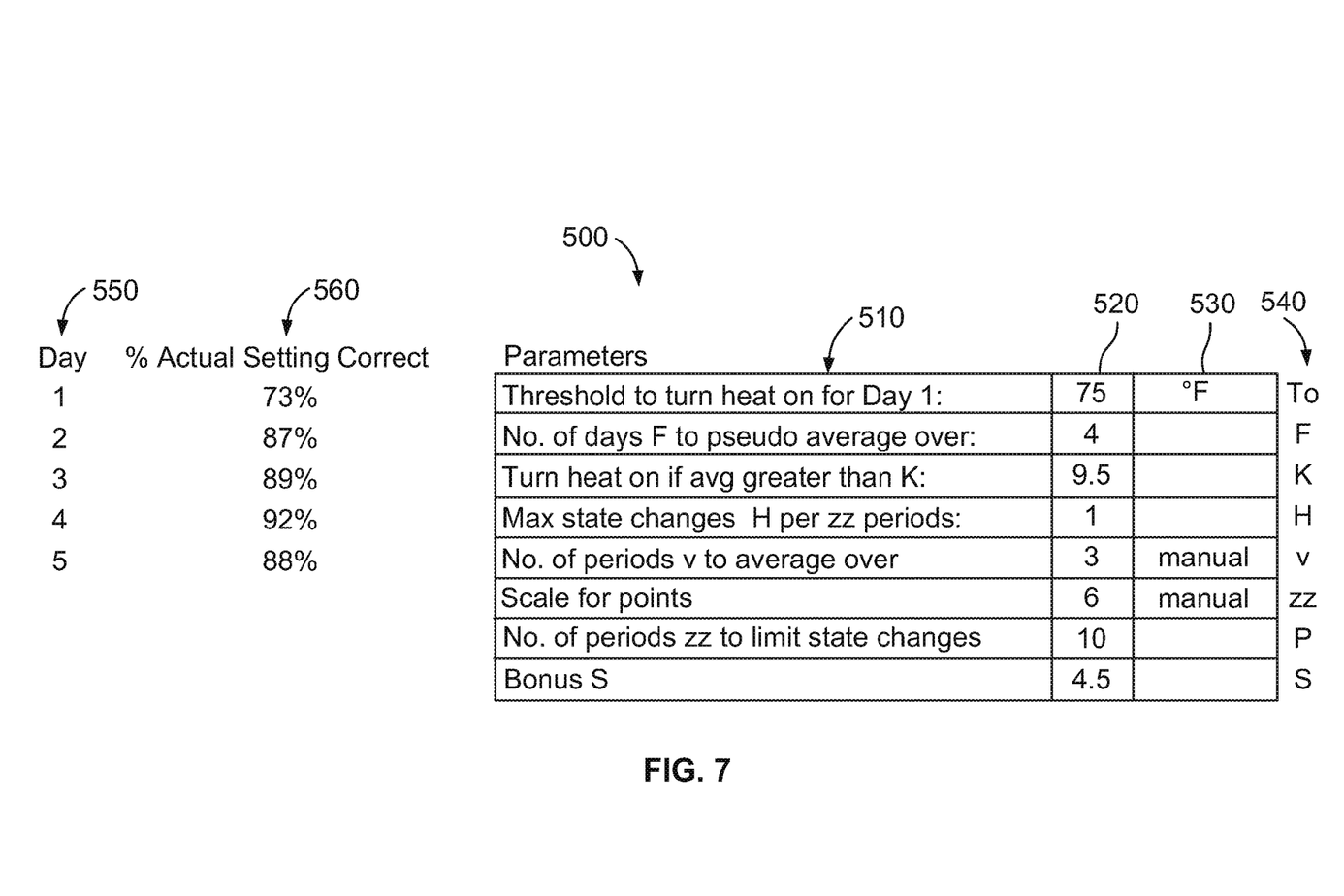
FIG. 7 is a chart identifying a number of parameters used in simulation and testing of the operation of the self-adjusting thermostat.

The parameters used for one simulation are set forth in chart 500 in FIG. 7, where column 540 includes parameters, To, F, K, H, v, zz, P, and S, where P represents the number of Points assigned for activity within a given period, and column 530 represents a temperature setting. Column 520 shows the selected values for these parameters, and column 510 shows the descriptions of the parameters. Beneath the heading Day 550 each of Days 1 through 5 is set forth and beneath heading % Actual Setting Correct 560, the percentage of correct settings achieved by the simulation is set forth, e.g., on Day 2, 87% of the settings were correct, on Day 3 89% of the settings were correct, on Day 4, 92% of the settings were correct, etc. In this example, the value K was set at a maximum of 9.5 and the value S was set at a maximum of 4.6.

As would be expected, analyzing the effect on the model of all values of K and S could be an overwhelming task. However, by use of a heuristic approach (identification of a good solution, not necessarily an optimal solution), coupled with the "macro" capability of modern spreadsheets, "good" values of K and S can quickly be determined. This is accomplished by evaluating K and S in a fixed number of increments over their range (0 to 10). For example, K is modeled from 1.0 to 4.6 in increments of 0.2 and S is modeled from 1.0 to 5.0 in increments of 1.0 and from 5.5 to 9.5 in increments of 0.5.

Figure 8:
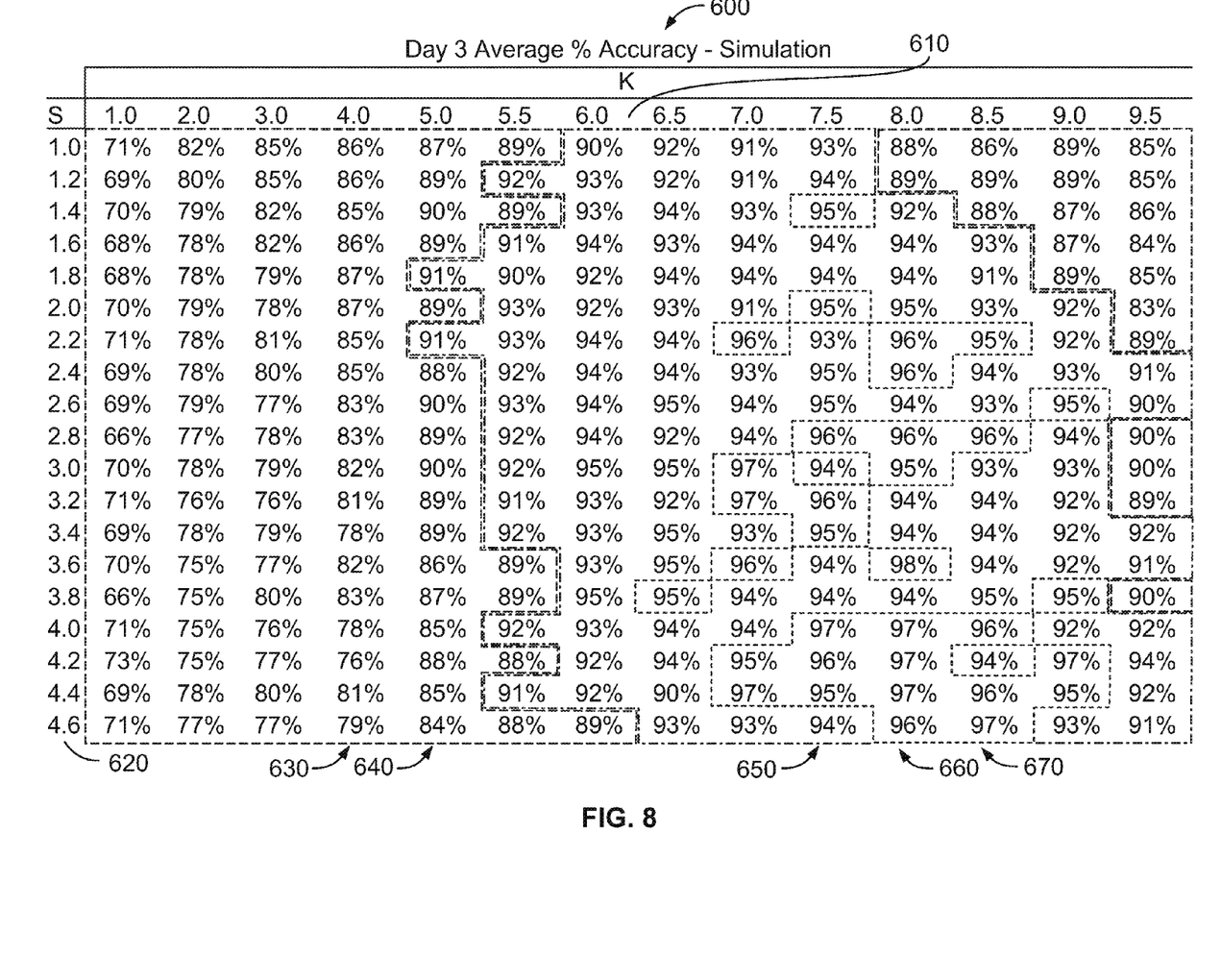
FIG. 8 is a chart setting forth the performance of the simulated testing of the self-adjusting thermostat when using different values for the variables K and S for Day 3.

By compiling tables of the algorithm accuracy after Day 2, Day 3, Day 4 and Day 5, the efficiency of the model and the effect of varying parameters S and K can be observed. FIG. 8 shows a compiled table 600 of the algorithm accuracy after Day 3 using K values of between 1.0 and 9.5 and S values between 1.0 and 4.6. The K values are shown in columns beneath heading 610 (K) and the S values are shows in the rows beside the column 620 S. Thus, for example, column 630 reveals that when using a K value of 4.0, the algorithm accuracy varies from 76%-87% with most readings in the eighties. Column 640 shows that when increasing the K value to 5.0, the algorithm accuracy improves, varying from 87%-94% with most readings in the nineties. Columns 650, 660, and 670 show that a high degree of algorithmic accuracy was achieved using K values of 7.5, 8.0, and 8.5 respectively. The most accurate results were achieved using a K value of 8.0 registering 88%-98% accuracy with most in the upper nineties with S values varying between 1.6 and 4.6.

Figure 9:
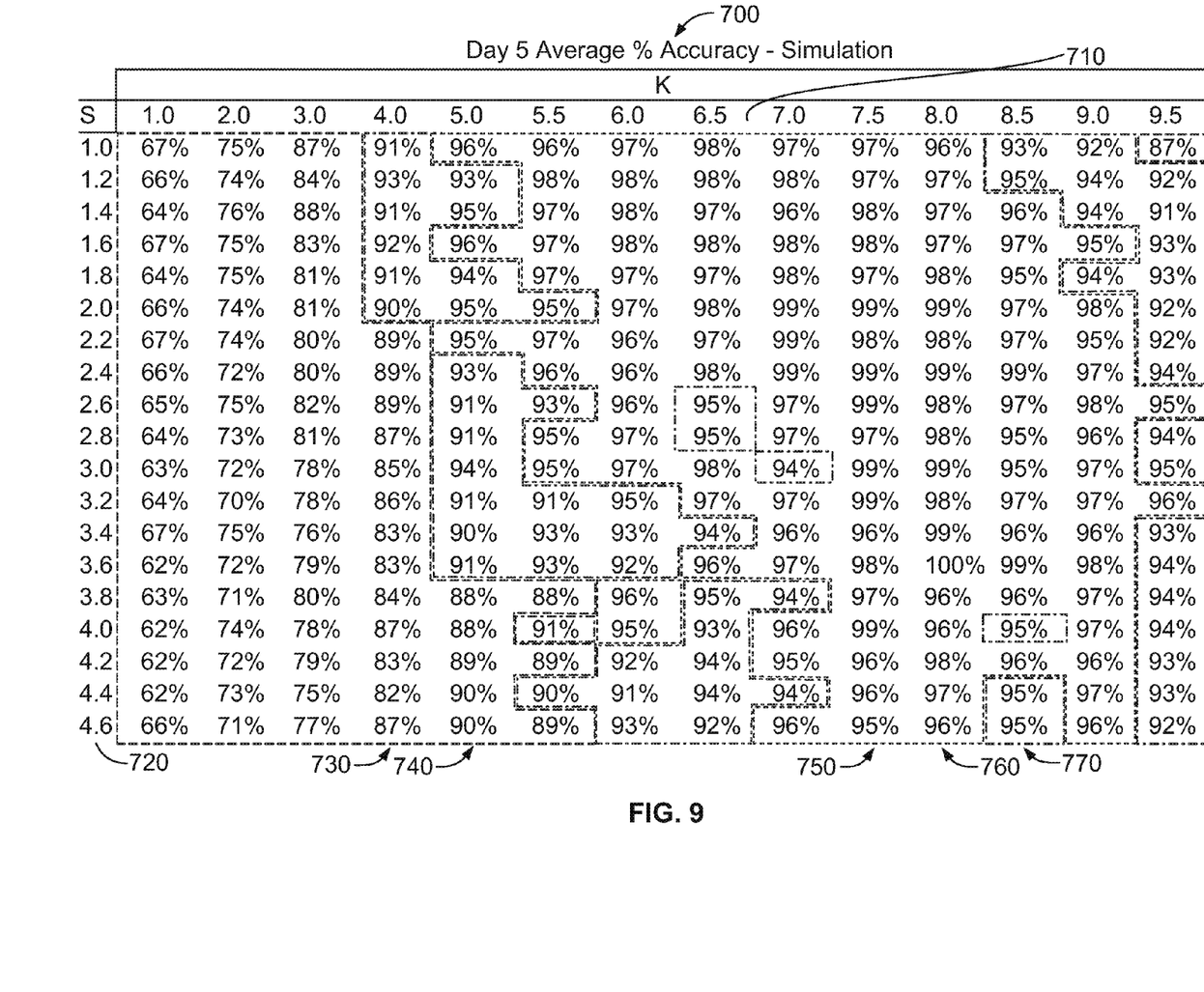
FIG. 9 is another chart setting forth the performance of the simulated testing of the self-adjusting thermostat when using different values for the variables K and S for Day 5.

FIG. 9 shows a compiled table 700 of the algorithm accuracy after Day 5 using K values of between 1.0 and 9.5 and S values between 1.0 and 4.6. The K values are shown in columns beneath heading 710 (K) and the S values are shows in the rows beside the column 720 S. Thus, for example, column 730 reveals that when using a K value of 4.0, the algorithm accuracy varies from 82%-92% with most readings in the eighties. Column 740 shows that when increasing the K value to 5.0, the algorithm accuracy improves, varying from 88%-96% with most readings in the nineties. Columns 750, 760, and 770 show that a high degree of algorithmic accuracy was achieved using K values of 7.5, 8.0, and 8.5 respectively. The most accurate results were achieved using a K value of 7.5 registering 95%-99% accuracy with all S values 1.0-4.6, and using a K value of 8.0 registering 96%-100% accuracy with S values varying between 1.6 and 4.6.

Further, the tables of results of the modeling clearly indicate that the values of 8.0 for K and 3.2 for S are quite robust and provide quick learning (at least 90% accurate within 3 days). Based on these results, the algorithm can proceed to be used to provide a quick and efficient method to learn lifestyle and adjust temperature setting accordingly.

Determination of Sensitivity Parameters

Additional runs of the simulation model were undertaken to determine the values of the Bonus, S that could be used to allow for various "sensitivity levels". A basic approach was taken wherein Low, Medium and High sensitivity levels would be included. In a Low sensitivity situation, the algorithm would not be affected by higher levels of "noise", such as frequent activity sensings during a sleep time. Similarly, in High sensitivity levels, the algorithm would recognize these sensings and adjust heat settings accordingly.

Hence, a series of "stable" days were set up in the model—these were days in which the model had already learned the lifestyle and was routinely controlling the temperature. Then, a series of days with activity in one of the normally inactive times was incorporated—this was done by increasing the probability of activity in this time from 10% to 50% for 2 periods (20 minutes), such as may happen when one of the system users would come home briefly for lunch about half the time.

By exercising the model according to the foregoing situation, the following data was obtained as set forth in Table 1 below:

TABLE 1

Day 5 Average % Accuracy - Simulation Run - Sensitivity
Test First Case - Factory Settings with 10% and 90% Probabilities
except 50% probability in periods 73 and 74.

| S | K = 8.0 |
|---|---|
| 2.6 | 95% |
| 2.8 | 96% |
| 3.0 | 97% |
| 3.2 | 97% |
| 3.4 | 96% |
| 3.6 | 97% |
| 3.8 | 98% |

Hence, it was evident that at Bonus level of 2.6, accuracy of the model was reduced, indicating that the model was "ignoring" activity with a low probability of occurrence. Increasing bonus beyond the standard level of 3.2 indicated that accuracy improved up to about bonus level of 3.8. Hence, it was concluded that bonus of 2.7 would be suitable for Low sensitivity and 3.7 for High sensitivity and 3.2 from Medium sensitivity. Note that Bonus levels less than 2.6 and greater than 4.0 were not considered since they have been previously identified as non-optimal values.

Example embodiments of the present invention have been described above. Those skilled in the art will understand that changes and modifications may be made to the described embodiments without departing from the true scope and spirit of the present invention, which is defined by the claims.

I claim:

1. A method of controlling the temperature of an environment comprising the steps of:
   providing a thermostat adapted to have values in the memory of a microprocessor assigned for discrete time periods in a 24 hour time period;
   receiving a signal from an occupancy sensor in an area indicating whether that area has been occupied for each discrete time period of the 24 hour time period;
   assigning a first point value to each discrete time period where occupancy has been sensed during that discrete time period in a first 24 hour time period;
   assigning a second point value to each discrete time period where occupancy has been sensed during that discrete time period in a second 24 hour time period that predates the first 24 hour time period;
   assigning a third point value to each discrete time period where occupancy has been sensed during that discrete time period in a third 24 hour time period that predates the second time period;
   averaging the point values for each discrete time period in the first, second, and third 24 hour periods, where occupancy was sensed in any of the first, second, or third 24 hour periods to obtain an average point value;
   sending a first signal to a heating device adapted for heating a location to provide a temperature-related setting for a given discrete time period when the average point value for that discrete time period is above a threshold point value K.

2. The method of claim 1, wherein each discrete time period is of the same length.

3. The method of claim 2, wherein each discrete time period is ten minutes in length.

4. The method of claim 1, wherein a temperature of the heating device is adjusted by an expected occupancy pattern of the area.

5. The method of claim 1, wherein the temperature-related setting is a high temperature setting or an on setting.

6. The method of claim 1, further including sending a second signal to the heating device to provide a temperature-related setting for a given discrete time period when the average point value for that discrete time period is equal to or below a threshold value K.

7. The method of claim 6, wherein the temperature-related setting based on the second signal is a low temperature setting or an off setting.

8. The method of claim 7, wherein the thermostat includes a pre-absence memory such that when no occupancy is sensed for an extended period, the average point value within each discrete time period will fall below the threshold value and the temperature-related setting based on the second signal is a low temperature setting or an off setting, and when occupancy is resumed, the point values in each discrete time period are returned to the levels they were at prior to the extended period of no occupancy.

9. The method of claim 6, further including sending a third signal to the heating device to provide a temperature-related setting for a given discrete time period when the average point value for that discrete time period is below the threshold value but above a floor value.

10. The method of claim 9, wherein the temperature-related setting based on the third signal is an intermediate temperature.

11. The method of claim 6, wherein the first, second, and third point values are between 0 and 10 points inclusive, and the value of the threshold value K is between 6.0 to 9.0 inclusive.

12. The method of claim 11, wherein the threshold value K is between 7.5 and 8.5 inclusive.

13. The method of claim 12, wherein the threshold value K is 8.0.

14. The method of claim 11, further including the step of assigning bonus points S to the point values for periods of occupancy in a discrete time period that repeats itself, where the value of S is between 1.0 and 4.6 inclusive.

15. The method of claim 14, wherein the value of S is between 2.7 and 3.7 inclusive.

16. The method of claim 1, where values are preset by a manufacturer of the thermostat.

17. The method of claim 1, where the values are preset by an end user.

18. The method of claim 1, wherein expedited learning is provided by adopting a 5/2 lifestyle pattern.

19. The method of claim 1, further including the step of assigning bonus points S to the point values for periods of occupancy in a discrete time period that repeats itself.

20. The method of claim 19, further including the step of allowing the user to increase or decrease the sensitivity of the method by increasing or decreasing the value of the bonus points S.

21. The method of claim 1, further including the step of limiting the number of adjustments that may be made to the temperature setting to once per a given time duration.

22. The method of claim 21, wherein the given time duration is one hour.

23. The method of claim 1, wherein additional 24 hour periods of time are used to calculate the point value average.

24. The method of claim 1, wherein the location is positioned in the area where occupancy is sensed.

25. The method of claim 1, wherein the location is positioned in site that is different from the area where occupancy is sensed.

26. The method of claim 1, wherein the first point value is different than the second point value and third point value, and the second point value is different than the third point value.

27. The method of claim 26, wherein the first point value is greater than the second point value and the third point value, and the second point value is greater than the third point value.

28. A system for controlling the temperature of an environment comprising:
an input/output unit associated with a computer processing unit and a memory adapted to have values assigned for discrete time periods in a 24 hour time period;
an occupancy sensor in an area that sends a signal to the input/output unit indicating whether that area has been occupied for each discrete time period of a 24 hour time period;
a first point value assigned to each discrete time period where occupancy has been sensed during that discrete time period in a first 24 hour time period;
a second point value assigned to each discrete time period where occupancy has been sensed during that discrete time period in a second 24 hour time period that predates the first 24 hour time period;
a third point value assigned to each discrete time period where occupancy has been sensed during that discrete time period in a third 24 hour time period that predates the second time period;
an average of the point values for each discrete time period in the first, second, and third 24 hour periods, where occupancy was sensed in any of the first, second, or third 24 hour periods to obtain an average point value; and
a heating device that receives a signal from the input/output device adapted for heating a location to provide a temperature-related setting for a given discrete time period when the average point value for that discrete time period is above a threshold point value K.

29. The system of claim 28, wherein each discrete time period is of the same length.

30. The system of claim 29, wherein each discrete time period is ten minutes in length.

31. The system of claim 28, wherein the heating device further receives a second signal to provide a temperature-related setting for a given discrete time period when the average point value for that discrete time period is equal to or below a threshold value K.

32. The system of claim 31, wherein the temperature-related setting based on the second signal is a low temperature setting or an off setting.

33. The system of claim 28, where bonus points S are added to the point values for periods of occupancy in a discrete time period that repeats itself.

34. The system of claim 33, wherein the location is positioned in the area where occupancy is sensed.

35. The system of claim 28, wherein the location is position in a site different from where occupancy is sensed.

36. The system of claim 28, wherein the first point value is different than the second point value and third point value, and the second point value is different than the third point value.

37. The system of claim 36, wherein the first point value is greater than the second point value and the third point value, and the second point value is greater than the third point value.

38. The system of claim 28, wherein the first, second, and third point values are between 0 and 10 points inclusive, and the value of the threshold value K is between 6.0 to 9.0 inclusive.

39. The system of claim 38, wherein the threshold value K is between 7.5 and 8.5 inclusive.

40. The system of claim 38, wherein bonus points S are assigned to the point values for periods of occupancy in a discrete time period that repeats itself, where the value of S is between 1.0 and 4.6 inclusive.

41. The system of claim 40, wherein the value of S is between 2.7 and 3.7 inclusive.

42. A self-adjusting thermostat for controlling the temperature of an environment comprising:
input/output unit associated with a computer processing unit and a memory adapted to have values assigned for discrete time periods in a 24 hour time period;
wherein the input/output unit is adapted to receive a signal from an occupancy sensor in an area indicating whether that area has been occupied for each discrete time period of the 24 hour time period;
a first point value assigned to each discrete time period where occupancy has been sensed during that discrete time period in a first 24 hour time period;
a second point value assigned to each discrete time period where occupancy has been sensed during that discrete time period in a second 24 hour time period that predates the first 24 hour time period;
a third point value assigned to each discrete time period where occupancy has been sensed during that discrete time period in a third 24 hour time period that predates the second time period;
an average of the point values for each discrete time period in the first, second, and third 24 hour periods, where occupancy was sensed in any of the first, second, or third 24 hour periods to obtain an average point value;
wherein the input/output unit is adapted to send a signal to a heating element for heating a location area to provide a temperature-related setting for a given discrete time period when the average point value for that discrete time period is above a threshold point value K.

43. The thermostat of claim 42, wherein each discrete time period is of the same length.

44. The thermostat of claim 43, wherein each discrete time period is ten minutes in length.

45. The thermostat of claim 42, wherein the input/output unit is adapted to send a second signal to a heating element to provide a temperature-related setting for a given discrete time period when the average point value for that discrete time period is equal to or below a threshold value K.

46. The thermostat of claim 45, wherein the temperature-related setting based on the second signal is a low temperature setting or an off setting.

47. The thermostat of claim 42, where bonus points S are added to the point values for periods of occupancy in a discrete time period that repeats itself.

48. The thermostat of claim 42, wherein the location is positioned in the area where occupancy is sensed.

49. The thermostat of claim 42, wherein the location is in a site different from the area where occupancy is sensed.

50. The thermostat of claim 42, wherein the first point value is different than the second point value and third point value, and the second point value is different than the third point value.

51. The thermostat of claim 50, wherein the first point value is greater than the second point value and the third point value, and the second point value is greater than the third point value.

52. The thermostat of claim 42, wherein the first, second, and third point values are between 0 and 10 points inclusive, and the value of the threshold value K is between 6.0 to 9.0 inclusive.

53. The thermostat of claim 52, wherein bonus points S are assigned to the point values for periods of occupancy in a discrete time period that repeats itself, where the value of S is between 1.0 and 4.6 inclusive.

54. The thermostat of claim 53, wherein the value of S is between 2.7 and 3.7 inclusive.

55. The thermostat of claim 42, wherein the threshold value K is between 7.5 and 8.5 inclusive.

* * * * *